Feb. 7, 1933.  A. V. HENST  1,896,309

CLOSURE FOR RADIATORS AND THE LIKE

Filed Dec. 18, 1929

INVENTOR
Abraham Van der Henst
BY Chappell & Earl
ATTORNEYS

Patented Feb. 7, 1933

1,896,309

UNITED STATES PATENT OFFICE

ABRAHAM VANDER HENST, OF GRAND RAPIDS, MICHIGAN, ASSIGNOR TO W. B. JARVIS COMPANY, OF GRAND RAPIDS, MICHIGAN

CLOSURE FOR RADIATORS AND THE LIKE

Application filed December 18, 1929. Serial No. 414,898.

The main object of this invention is to provide a closure for radiator necks, oil tanks and the like which may be quickly applied or removed, the opening being very effectively sealed and the structure being very compact.

A further object is to provide a closure having these advantages which is very simple and economical in its parts and at the same time strong and durable.

Objects pertaining to details and economies of my invention will definitely appear from the description to follow. The invention is defined in the claims.

A structure embodying the features of my invention is clearly illustrated in the accompanying drawing, in which.

Figure 1:
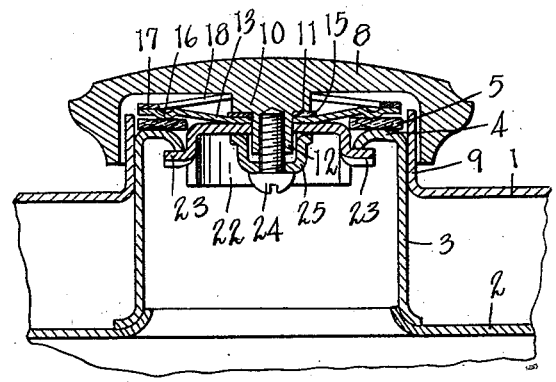
Fig. 1 is a fragmentary section of an automobile radiator closure embodying the features of my invention, mainly in section on line 1—1 of Fig. 2.
Figure 2:
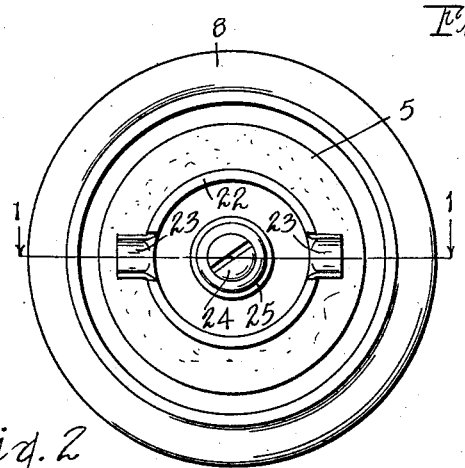
Fig. 2 is an inverted view of the cap and parts carried thereby.
Figure 3:
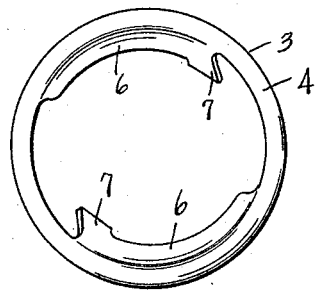
Fig. 3 is a plan view of the neck.
Figure 4:
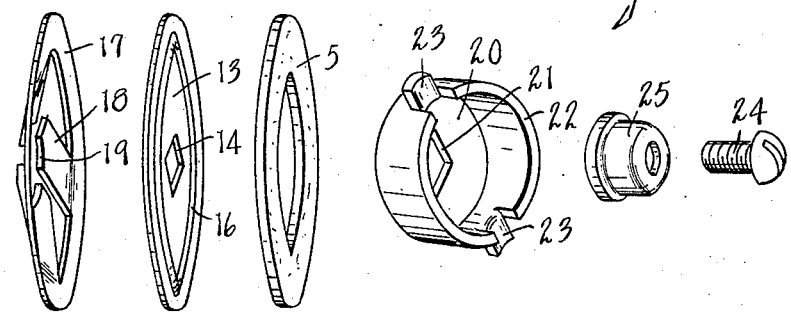
Fig. 4 is a perspective view of the closure supporting spring, closure, gasket, keeper member, cupped washer and screw disassembled.

In the embodiment illustrated 1 represents the radiator shell of a motor vehicle, 2 the radiator, and 3 the neck of the filling opening. This neck is provided with an inturned flange 4 forming a seat for the gasket 5. On the inner edge of this flange I form a pair of cammed keepers 6 having stops 7 at corresponding ends thereof.

The body portion of the cap 8 is preferably a die casting and the cap is internally chambered to receive the projecting portion 9 of the shell surrounding the neck 3. The cap has a depending central stud 10 shouldered at 11, the portion 12 of the stud projecting beyond the shoulder being of non-circular cross section.

The closure disk or member 13 is formed of resilient material, preferably spring brass, and this has a central non-circular opening 14 to receive the non-circular portion of the stud whereby the closure disk is supported against rotation relative to the stud. A packing or gasket 15 is arranged between the shoulder and the closure disk to seal the joint at this point.

The closure disk has an annular rib-like gasket engaging corrugation 16 formed therein, preferably positioned to engage the gasket at a central point. The resilient closure member is supported by an annular spring member 17 which rests on the closure adjacent its outer edge and is provided with a plurality of radially disposed tongue-like integral springs 18 which engage the stud. The ends of the the springs are notched at 19 to receive the stud. This accurately positions the spring member and prevents lateral shifting thereof.

The keeper member 20 is arranged on the non-circular portion of the stud which has a non-circular opening 21 therein to receive the same. This keeper member has a depending flange 22 with keeper engaging lugs 23 struck outwardly therefrom. The parts are clamped upon the stud by means of the screw 24 which is tapped into the stud and provided with a cupped washer 25 embracing the end of the stud, see Fig. 1.

With the parts thus formed and arranged they may be very rapidly assembled, are economical to produce, and the structure is at the same time very strong, durable and effective in sealing the opening. The projecting lugs 23 secure the gasket to the cap.

I have illustrated and described my improvements in a simple embodiment as designed for radiator necks. I have not attempted to illustrate or describe other embodiments or adaptations which I contemplate, as it is believed that this disclosure will enable those skilled in the art to embody or adapt my improvements as may be desired.

Having thus described my invention what I claim as new and desire to secure by Letters Patent is:

1. In a closure, the combination of a neck having an inturned flange providing a gasket seat and having oppositely disposed segmental cammed keepers on the edges thereof, a chambered cap having a central shouldered stud, the portion of the stud projecting beyond the shoulder being of non-circular cross section, a resilient closure member having a non-circular opening engaging said stud and supported by the shoulder thereof, said closure having an annular rib-like gasket seat, an annular spring member resting on said closure member adjacent the entire periphery thereof exclusively and having a plurality of integral radially disposed tongue-like springs engaging the said stud, a gasket disposed between said gasket seats, a latch member arranged on the non-circular portion of said stud below said closure member and having a downwardly projecting flange with keeper engaging lugs struck outwardly therefrom, and a retaining screw provided with a cupped washer for clamping said latch member and closure upon said stud shoulder.

2. In a closure, the combination of a neck provided with keepers, a chambered cap having a central shouldered stud, the portion of the stud projecting beyond the shoulder being of non-circular cross section, a resilient closure member having a non-circular opening engaging said stud and supported by the shoulder thereof, an annular spring member resting on said closure member adjacent the entire periphery thereof exclusively and having a plurality of integral radially disposed tongue-like springs engaging the said stud, a latch member arranged on the non-circular portion of said stud below said closure member and having a downwardly projecting flange with keeper engaging lugs struck outwardly therefrom, and a retaining screw provided with a cupped washer for clamping said latch member and closure upon said stud shoulder.

3. In a closure, the combination of a neck having an inturned flange providing a gasket seat and having oppositely disposed segmental cammed keepers on the edges thereof, a chambered cap having a central shouldered stud, the portion of the stud projecting beyond the shoulder being of non-circular cross section, a resilient closure member having a non-circular opening engaging said stud and supported by the shoulder thereof, said closure having an annular rib-like gasket seat, a latch member arranged on the non-circular portion of said stud below said closure member and having a downwardly projecting flange with keeper engaging lugs struck outwardly therefrom, a gasket disposed between said gasket seats, and a retaining screw provided with a cupped washer for clamping said latch member and closure upon said stud shoulder.

4. In a closure, the combination of a neck provided with keepers, a chambered cap having a central shouldered stud, the portion of the stud projecting beyond the shoulder being of non-circular cross section, a resilient closure member having a non-circular opening engaging said stud and supported by the shoulder thereof, a latch member arranged on the non-circular portion of said stud below said closure member and having a downwardly projecting flange with keeper engaging lugs struck outwardly therefrom, and a retaining screw provided with a cupped washer for clamping said latch member and closure upon said stud shoulder.

5. In a closure, the combination of a neck having an inturned flange providing a gasket seat and having oppositely disposed segmental cammed keepers on the edges thereof, a chambered cap having a central shouldered stud, the portion of the stud projecting beyond the shoulder being of non-circular cross section, a resilient closure member having a non-circular opening engaging said stud and supported by the shoulder thereof, said closure having an annular rib-like gasket seat, an annular spring member resting on said closure member adjacent the entire periphery thereof exclusively and having a plurality of integral radially disposed tongue-like springs engaging the said stud, a gasket disposed between said gasket seats, and a latch member arranged on the non-circular portion of said stud below said closure member and having keeper engaging lugs struck outwardly therefrom.

6. In a closure, the combination of a neck provided with keepers, a chambered cap having a central shouldered stud, the portion of the stud projecting beyond the shoulder being of non-circular cross section, a resilient closure member having a non-circular opening engaging said stud and supported by the shoulder thereof, an annular spring member resting on said closure member adjacent the entire periphery thereof exclusively and having a plurality of integral radially disposed tongue-like springs engaging the said stud, a gasket disposed between said neck and said closure member, and a latch member arranged on the non-circular portion of said stud below said closure member and having keeper engaging lugs struck outwardly therefrom.

7. In a closure, the combination of a neck provided with keepers, a cap having a depending shouldered stud, a resilient closure member arranged on said stud, an annular spring member resting on said closure member adjacent the entire periphery thereof exclusively and having a plurality of integral spring-like tongues engaging said cap, a gasket disposed between said neck and said closure member, and a latch member arranged on said stud below said closure member and provided with keeper engaging lugs.

8. In a closure, the combination of a neck provided with keepers, a chambered cap having a depending stud, a resilient closure member arranged on said stud in overlapping relation to the end of the neck, a spring member supporting the entire outer edge of said closure member exclusively, a gasket disposed between said neck and said closure member, and a latch member arranged below said closure member and provided with keeper engaging lugs.

9. In a closure, the combination with a neck provided with keepers and with an annular gasket seat, of a cap having a depending stud, a resilient closure member arranged on said stud in overlapping relation to the end of the neck and having an annular rib-like gasket seat in opposed relation to the gasket seat of said neck, a gasket disposed between said gasket seat on said neck and said closure member, and a thrust spring for said closure member in supporting engagement with said closure member at the outer side of its said annular rib-like gasket seat.

10. In a closure, the combination with a neck provided with keepers and with an annular gasket seat, of a cap having a depending stud, a resilient closure member arranged on said stud in overlapping relation to the end of the neck and having an annular rib-like gasket seat in opposed relation to the gasket seat of said neck, and a gasket disposed between said gasket seat on said neck and said closure member.

In witness whereof I have hereunto set my hand.

ABRAHAM VANDER HENST.